United States Patent
Devol et al.

[11] 3,890,552
[45] June 17, 1975

[54] DUAL-ARMED MULTI-AXES PROGRAM CONTROLLED MANIPULATORS

[76] Inventors: George C. Devol, 990 Ridgefield Rd., Wilton, Conn. 06897; Paul S. Martin, 189-54 43rd Rd., Flushing, N.Y. 11358

[22] Filed: Dec. 29, 1972

[21] Appl. No.: 319,360

[52] U.S. Cl. .............. 318/568; 318/578; 318/574; 214/1
[51] Int. Cl. .......................................... G05b 19/42
[58] Field of Search .......... 318/568, 578, 640, 574; 214/1

[56] References Cited
UNITED STATES PATENTS

| | | | |
|---|---|---|---|
| 2,996,348 | 8/1961 | Rosenberg | 318/568 X |
| 3,164,909 | 1/1965 | Rosenberg | 318/568 X |
| 3,279,624 | 10/1966 | Devol | 318/574 X |
| 3,389,312 | 6/1968 | Redman | 318/640 X |
| 3,526,903 | 9/1970 | Brenner et al. | 318/578 X |
| 3,727,119 | 4/1973 | Stanley et al. | 318/578 X |

FOREIGN PATENTS OR APPLICATIONS 781,465   8/1957   United Kingdom

*Primary Examiner*—Lynch: T. E.

[57] ABSTRACT

First and second manipulators cooperate with each other in executing a series of operations including motions in what may be called the mirror-image mode. Each unit has a main operating structure that carries a work head through several degrees of freedom in space, and the work head itself is capable of various secondary movements. The two manipulators are capable of operating under separate controls for executing related but independent operations. Separate manual controls are used for the two manipulators where the manipulators have a form of memory, they can also operate automatically under the separate control of their respective memories. However, the two manipulators are operable at other times in a cooperative, complementary mode, the same commands being used directly or indirectly to control both manipulators. In the case of indirect control of the second manipulator, control input or commands are used to control operation of the first manipulator and control input for effecting corresponding, cooperative operations of the second manipulator are derived from the operations of the first manipulator, the two manipulators; operating in a corresponding manner, and maintaining their work heads in alignment with each other. In the case of direct control, the second manipulator responds to the same control input or commands as those supplied to the first manipulator, the two manipulators motions, executing the same motions or mirror-image motions as required, adjustment being introduced for maintaining alignment and controlled of the work heads.

16 Claims, 7 Drawing Figures

PATENTED JUN 17 1975 3,890,552

SHEET 1

DUAL-ARMED MULTI-AXES PROGRAM CONTROLLED MANIPULATORS

This invention relates to manipulators, for a variety of applications as in assembly operations and in inspection operations.

BACKGROUND OF THE INVENTION

Power-actuated manipulators have been used for a variety of tasks. They may be of a type intended for operation by remote control. Others operate under control of a memory or recordings, and such manipulators are usually operable under manual control for initially generating the control recordings. Manipulators controlled by recordings are here called "robots", and where they are designed for executing industrial operations, they are here called "industrial robots".

Manipulators designed solely for manual control have usually been used individually. Where related tasks are to be performed by two manipulators, each manipulator has responded to its own controls. Industrial robots have been proposed in which two arms operate under program controls to perform related tasks, as in British Pat. No. 781,465 granted to Kenward. The control recordings for the two arms in Kenward are generated by causing such arms to execute their own sequence of motions under their own manual controls and control recordings are made concurrently.

Manual control of a robot can be effected in either of two ways for generating control recordings. In one way which may be called direct manual control, the actuators of the robot respond directly to manual controls, and the robot operates devices (such as encoders or selsyn signal generators or pulse-train generators or the like) that provide signals representing the manually controlled robot operations and which are recorded for use in subsequent program-controlled operation of the robot. In another way which may be called indirect manual control, manual controls are used to generate control signals, and these signals are used both for control of the robot and for concurrent recording of the program needed for subsequent automatic operation of the robot. The same two types of manual control are also useful in the case of manipulators that are not equipped with control storage needed for automatic program-controlled operation.

Separate controls have heretofore been needed for each of two manipulators intended for use together. Separate manual and program controls have also been included in each of two cooperating robots, as proposed in Kenward.

SUMMARY OF THE INVENTION

An important purpose of the invention is to simplify the control of manually controlled manipulators that cooperate with each other in a prescribed manner, especially in the case of two manipulators having devices such as tools that cooperate with each other, maintaining an aligned relationship during any one operation and in a sequence of operations. This is achieved by using a manual control (direct or indirect) for one manipulator, and deriving the cooperating control for the other manipulator directly or indirectly from the first manipulator. An electromechanical function generator, in the illustrative apparatus detailed below, is a form of computer that generates adjustment values that are combined with control signals provided by the first manipulator (the same signals or the inverse thereof) to maintain the location and the attitude of the work head of the second manipulator in aligned cooperation with the work head of the first.

In the illustrative embodiments, two manipulators that cooperate are alike in their basic structure. Each manipulator, detailed more fully below, has a secondary unit that is carried at the end of an arm and the secondary unit in turn carries a work head. The secondary unit is transported by the arm in what may be called primary motions through three dimensional paths in space. The secondary unit executes secondary motions relative to its supporting arm, usually for adjusting the aim or attitude of the tool or other device of the work head. The primary motions of the described manipulators are executed by actuators that cause operations in rectangular coordinates, and the secondary motions of the described manipulators are carried out in a system of polar coordinates. These primary and secondary motions could be altered so as to take place in other systems of coordinates, even to the extent of blurring the division between primary and secondary motions.

Examples of companion work devices carried by the two manipulators include a work holder of one manipulator and a companion tool such as a drill, tap, etc. of the other manipulator; or a work holder and companion device in the form of a part-assembling device such as a screw-inserter and driver; a device for assembling a component such as a nut to a second externally supported component and a companion device for driving a screw into both components; and an X-ray plate holder or an X-ray image tube or fluoroscope and a companion X-ray source.

In each instance, the work device of one manipulator is transported and its attitude in space is adjusted, and during operation in the mirror-image mode the other manipulator derives its control from the first manipulator so that even during operation of the first manipulator under manual control, the operation of the second manipulator is automatic. Thus, the derived control for the second robot can be selected manual controls of the first robot, or encoded signals generated by manipulation of the manual controls of the first manipulator as in FIG. 11 of Devol U.S. Pat. No. 3,279,264, or control of selected motions of the second robot can be obtained from feedback signal generators such as encoders of the first robot where the first robot is of the class having feedback motion control. Moreover the control information for causing the second manipulator to operate in the mirror-image mode could be entered or recorded in a program storage medium, so that subsequently each manipulator would be operating wholly under control of its own stored program and yet the desired performance in the mirror-image mode would be executed.

The operation of two robots in the mirror-image mode may involve a continuing sequence, as in making a sequence of X-ray inspections. However, both robots or manipulators may at times operate independently and at times in the mirror-image mode. As an example of the latter, two robots may operate independently in reaching for components to be assembled and then they may operate in the mirror-image mode in executing an assembly operation.

Thus, first and second manipulators are disposed in relation to each other for performing cooperative operations. They are operated under manual control, as well as under automatic control, in a system wherein control input or commands are provided for the first manipulator and the same commands are utilized to control the second manipulator in the requisite manner to effect corresponding cooperative operations. Those commands may be utilized in what may be called indirect control, where control of the second manipulator is derived from the operation of the first manipulator, or the commands provided for the first manipulator may be utilized for controlling the second manipulator directly, i.e., not derived from the operation of the first manipulator. For some motions, the commands are utilized in the same sense by both manipulators while in other motions the commands or the controls that respond to the commands are inverted to achieve the indicated cooperative relationships of the two manipulators. Automatically introduced adjustments maintain alignment and controlled spacing of cooperating work heads of the two manipulators. Where manual control is involved, it was necessary heretofore to control each of two manipulators individually. Here, both in the case of manual control and where an automatic program is being executed, only one sequence of control input or commands is needed for the two cooperating manipulators. Separate controls may be involved at times, so that separate control can be brought into effect, as where one manipulator is required to pick up a part from a supply point. Flexibility is preserved, but the added capability of cooperative functioning of two manipulators under the simplified system of common controls is introduced.

The nature of the invention and further features and advantages will be better appreciated from the detailed description below of the illustrative embodiment of the invention shown in the accompanying drawings.

Figure 4:
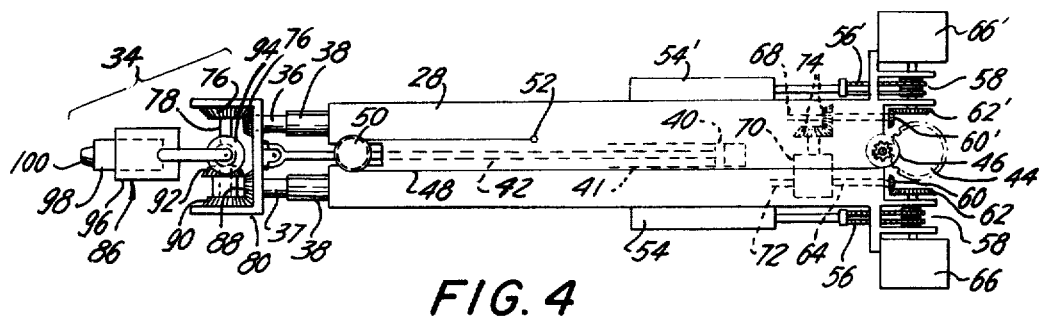
FIG. 4 is a top plan view of the upper portion of an illustrative robot of FIG. 1, shown in greater detail.
Figure 5:
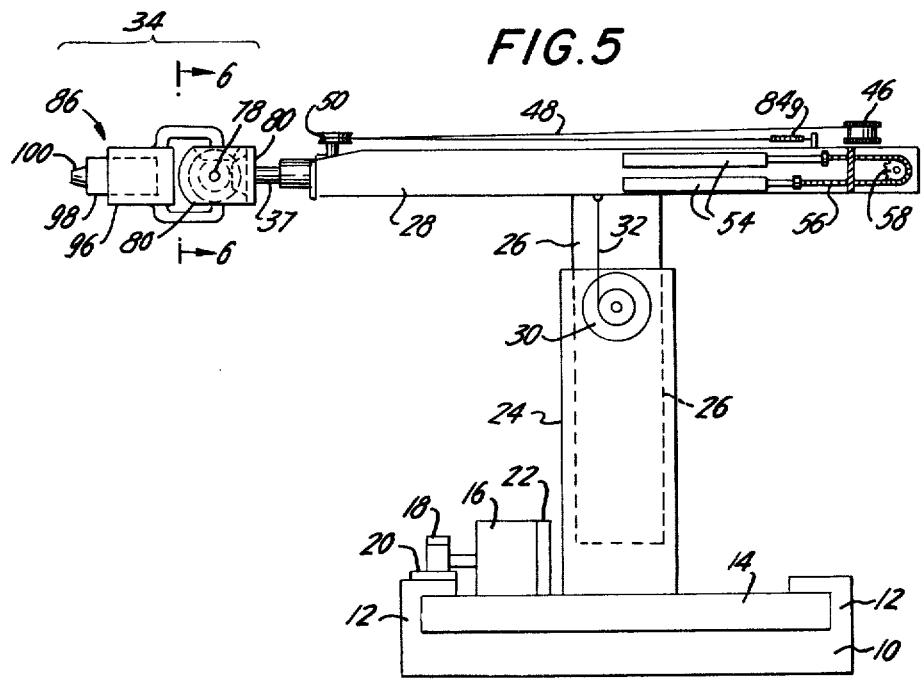
FIG. 5 is a side elevation of the robot of FIG. 4, parts being broken away and shown in section.
Figure 6:
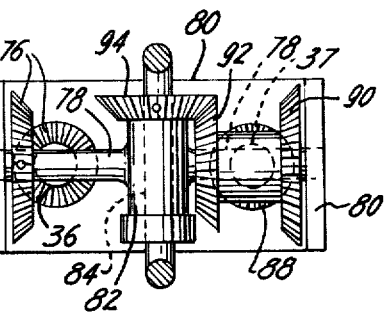
FIG. 6 is a detail of the apparatus of FIG. 5, viewed from the plane 6—6 in FIG. 5, shown partly in cross-section and drawn to larger scale.

One form of robot suitable for use in practicing the invention is shown in FIGS. 4–6. A stationary base 10 has side rails 12 for guiding a movable base or pedestal 14 along a horizontal path perpendicular to the plane of the view. This is referred to below as the Y direction or axis. A motor 16 on pedestal 14 has a drive pinion 18 meshed with rack 20 on rail 12, to drive the pedestal along the Y axis, forming the Y actuator. A digital encoder 22 provides numerical codes representing the position of pedestal 14 along rails 12.

Upright post 24 fixed to pedestal 14 contains a vertically movable post 26. In the form shown, post 26 is a piston that lifts arm 28 when hydraulic pressure develops in cylinder 24, forming the Z actuator. Means (not shown) prevents twisting motion of movable post 26 in post 24 about a vertical axis. A horizontal arm 28 is fixed to piston 26. A digital encoder 30 mounted on post 24 has a cable connection 32 to arm 28, for representing the height of arm 28 when the arm is moved vertically, in the Z direction. This encoder and others like it contain wind-up springs that keep their cables taut.

Secondary unit 34 is carried by a pair of internally splined tubes 36 and 37 that slide telescopically in tubes 38 in arm 28. Hydraulic piston 40 in a cylinder 41 in arm 28 has a rod 42 connected to unit 34 for operating secondary unit 34 horizontally in the X direction, at right angles to the Y direction. Piston 40 and cylinder 41 form the X actuator. Digital encoder 44 is geared to a spring-wound drum 46 that acts as a reel for cable 48. The remote end 52 of cable 48 is fixed to arm 28, and the cable extends around a pulley 50 that is fixed to rod 42.

Reverse-acting hydraulic cylinders 54 (FIG. 5) operate opposite ends of drive chains 56 trained over sprocket 58 for rotating between gears 60 and 62, shaft 64 and shaft 72. Shaft 72 is externally splined and fits internally splined tube 37, and produces what may be called a horizontal wrist bend of the tool of unit 34, that is, angular motion about a vertical axis. A like drive train whose parts bear corresponding primed numerals rotates shaft 68 and tube 36 to produce a "vertical wrist-bend" motion of the tool of unit 34, that is, angular motion about a horizontal axis.

Shaft 64 operates shaft 72 through a differential gearing unit 70, at the right in FIG. 4. Shaft 68 introduces a differential input into differential gear unit 70 via bevel gearing 74. Shaft 68 operates internally splined tube 36 in which it is slidable, to rotate bevel gears 76 in unit 34. Two-part shaft 78 is rotated about its horizontal axis in frame part 80 of unit 34 (FIGS. 4 and 6). The two parts of shaft 78 project from bearing 82, so that rotation of shaft 78 tilts bearing 82 and shaft 84 in that bearing, for moving work head 86 in a vertical arc about the horizontal axis of shaft 78.

Shaft 72 and internally splined tube 37 rotate bevel gear 88. Bevel-gear unit 90, 92 is rotatable on the right-hand part of shaft 78 as shown in FIG. 6. Unit 90, 92 is driven by bevel gear 88, and drives bevel gear 94 secured to shaft 84, for moving work head 86 in a horizontal arc about the vertical axis of shaft 84.

It is evident that horizontal wrist-bend of work head 86 about its vertical axis follows faithfully the rotation of shaft 72, and it follows faithfully the rotation of shaft 64 if bevel gears 74 are at rest and therefore do not supply input to differential gearing unit 70. It is evident, too, that rotation of shaft 68 causes corresponding tilt or vertical wrist-bend of work head 86 in a vertical arc about shaft 78. In so doing, however, shaft 68 would cause an unintentional horizontal wrist-bend of work head 86 about the axis of shaft 82 due to the mesh of bevel gear 94 with bevel gear 92. However, rotation of shaft 68 to cause vertical wrist-bend of work head 86 introduces a reverse compensating drive into differential 70 so that drive of work head 86 by shaft 68 to produce a vertical wrist-bend is not complicated by an unintended horizontal wrist-bend motion. It follows that encoders 66 and 66' faithfully represent the horizontal and vertical wrist-bend positions of work head 86.

Work head 86 includes an outer cylinder 96 and has means (not shown) for supplying hydraulic fluid to operate inner piston unit 98 in and out along an axis perpendicular to shaft 78. Suitable means is provided for arresting piston unit 98 against rotation about its longitudinal axis. Tool 100 is carried by unit 98, and may be equipped with drive means (not shown) for rotating the tool about the axis of cylinder 96. In case the extent of either the in-and-out drive of head 86 or its rotational drive is to be controlled, an appropriate form of drive means is to be included, such as a servo or a stepping-motor drive, or the like. One type of servo control is achieved through the use of encoders, such as encoder 66' used for controlling the wrist-bend motions, although other feed-back controls such as synchros and self-balancing potentiometers may also be used. Positive-incremental drives that do not involve feed-back such as a geared-down electrical stepping motor or the hydraulic analogue of such a motor can be used in case there is need for controlling the extent of thrust or rotary motion of tool 100. A wide range of suitable forms of drive control are well known in the art. However, control over the extent of these motions is not needed in some cases, as for example where tool 100 is a drill that is to be rotated and pushed outward for drilling a hole, or where a screw driver or a nut driver is needed.

The digitally controlled type of robot in FIGS. 4–6 is well known. The mechanism carried by arm 28 for controlling head 86 in horizontal and vertical wrist-bends is illustrative and is fully disclosed in U.S. Pat. No. 3,543,910, issued Dec. 1, 1970. In the present application, primary X, Y and Z actuators transport secondary unit 34 in various motions and to various positions, operating in a rectangular system of coordinates. Evidently the essentially polar-coordinate type of primary actuators of U.S. Pat. No. 3,543,910 can also be adapted to present purposes, and mixed systems involving linear and arcuate motions can also be adapted to present purposes. To advantage, drive 16 for controlled transport of the whole apparatus may be retained in polar and mixed-coordinate systems.

Figure 7:
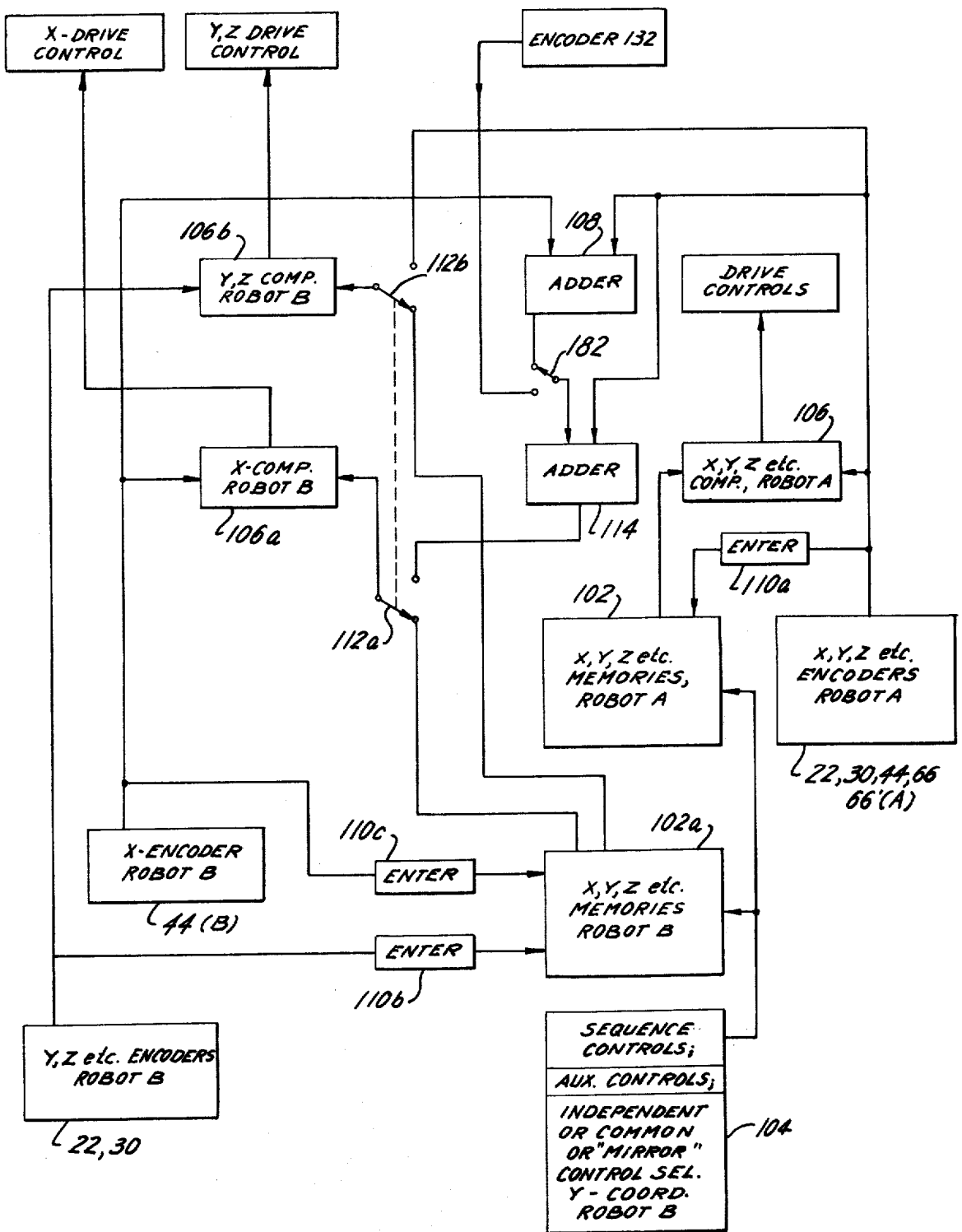
FIG. 7 is a block diagram representing the complete control apparatus for the robots of FIG. 1.

This type of apparatus characteristically has manual controls so as to be "manually" operable for executing a desired sequence of motions or point-to-point operations. FIG. 7 shows the control system for two robots A and B which are of the construction described above, and which are operable separately and in coordinated operations. Robot A may be considered alone. The readings of all the encoders of robot A (for example) for any one position are recorded or entered into memories 102 (FIG. 7). The controls of the apparatus are manipulated to cause the secondary unit 34 to be moved by the robot's actuators to successive positions, at each significant point entering the control coordinates in the memory 102a. Other entries are made in memories forming part of sequence control 104, to await "external" operations or to operate a tool at any given point, or to advance to the next position. Thus, it is common in conventional practice for tool 100 to be a pair of welding jaws, in which case the memory is given a "weld" command entry at certain points in the program, to be executed before the next motion controlling entry of the memory becomes effective.

After the program has been recorded, involving a sequence of complete coordinates representing successive positions and the various function-control entries, the robot operates under program control to execute automatically what has been "taught" under manual control. Where digital encoders are used, the codes are compared in comparer 106 with the recorded values in the memories; and the actuating motors, whether electrical, hydraulic or other, are caused to operate the robot until the encoders match the memories, usually stopping while the program control advances to the next step. As indicated above, potentiometers can replace the described digital encoders where the output of each potentiometer is converted to a digital value, or where the digital output of the memory is converted into an analogue value for nulling comparison with the potentiometer output. Indeed, point-to-point recording and control can be replaced, where appropriate, by continuous-motion-control recordings for selsyn-controlled robot drives. All such control systems form part of a single robot.

It has heretofore been proposed as in Kenward mentioned above that a two-armed robot may perform useful tasks, the two arms being controlled by two programs. Each arm must be taught to execute its own required movements. Pursuant to an important feature of the present invention, much of the teaching effort is obviated.

Figure 1:
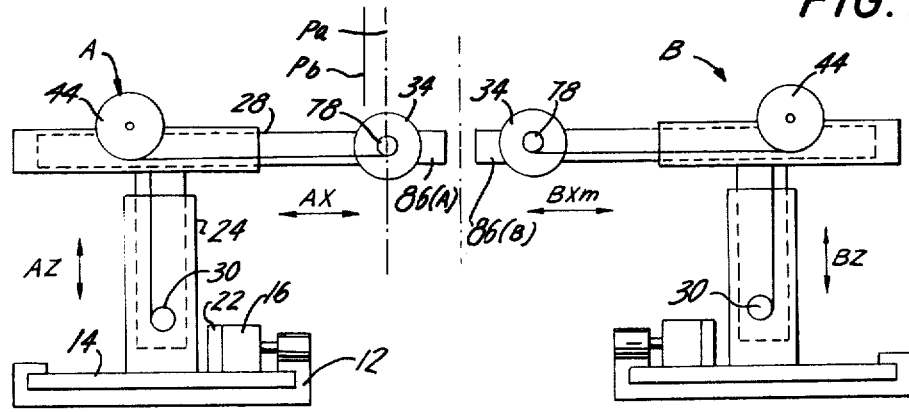
FIG. 1 is a diagrammatic elevation of two cooperating program-controlled robots.

Two duplicate robots A and B like that of FIGS. 4–6 are shown in FIG. 1. Here they are to be controlled by an integrated program-control unit. When a Y program motion is called for, pedestal 14 of robot A moves along the Y axis of the rectangular coordinate system, e.g., toward the viewer. Robot B, if made exactly the same as robot A, would move away from the viewer in response to the same Y instruction from the memory. Each robot arm would extend or retract its unit 34 along the X coordinate of the system, in response to a given program instruction. Both arms 28 would rise or descend along the Z coordinate in response to a given memory instruction.

There are many operations where tools 100 of the two robots are to cooperate. For example, robot A may have a nut holder and robot B may have a tool for seizing and driving a screw into the nut, first inserting it into holes of two parts to be united which are suitably supported between the robots. In a simple case, the hole is in a vertical panel whose plane is perpendicular to FIG. 1. The robots can be operated to align secondary units 34, 34 with each other at the hole location. Then work heads 96, 98, 100 (FIG. 4) of the two robots are controlled to perform their separate operations, screwing and holding in this case. The hole-locating, screwing and holding operations are repeated for the next screw and nut, and so on. The tools could likewise be riveting tools, or welding tools.

In another distinctive application, the sheet-metal wall of a steel tank can be inspected. The tool of robot A can be an X-ray source and that of robot B can be an X-ray image receiver, comparable to a fluoroscope or TV image tube, for transmitting the image to a distant film recorder.

In each of the foregoing instances, the two tools are to cooperate with each other at a sequence of positions.

Teaching and program-controlled operation of the two robots are simplified here by utilizing common instructions for both robots for certain operations. One control instruction — manual and later memory — serves both robots for the Z-coordinate drive. One instruction also serves both robots for the Y-direction drive, except that a mirror-image conversion is to be introduced into the control of robot B, for example, if the robots are identical and robot A is operated under primary control. Finally, on the assumption that it is required that units 34 of the two robots are to have the same separation for all of the operations where they do cooperate, the X instruction for robot A or the output of its X feed-back encoder 44 is utilized in the mirror-image mode in controlling the X-motion of robot B.

Understandably, there are some steps in the program where the robots are to perform independently, and then separate program instructions are used. For example, after one screw-insertion cycle is completed under common/mirror-image control, one robot may be programmed to go to a pick-up point to receive a screw. Then it is again operated under common/mirror-image control to execute the next screw-insertion step.

The saving in time needed for recording a program is enormous, since only one robot must be operated under manual control for each of its X, Y and Z and other related motions, and the other robot follows with corresponding motions or mirror-image complemental motions, as required. Further, the control system has unique value even where saving effort in program-generation may be of little concern. For example, a program may be needed for X-ray inspection of a submarine hull. In that application, both robots cannot even be observed at one time, so that they cannot be positioned in relation to each other inside and outside the hull in the usual way under manual-visual control. Indeed, there is distinct value to a feature of this control system even where the robots are always operated as manually controlled units and not as memory-controlled units. One robot can be manually controlled directly, in full view of the attendant, while the other robot operates according to control input derived from the first robot. The latter robot may be concealed from view, and may be controlled with automatic coordination to execute cooperating motions. Even where there is no problem of one of the robots being concealed, there is distinct advantage to being able to control only one robot directly while the other robot automatically executes cooperating motions that may be alike or mirror-image, depending on the motion involved.

In a still further mode of operation, the program of control data generated during manually controlled motions and other operations of robot A can be entered into the memory for controlling robot A while robot B is operated at times in accordance with control data derived from robot A; and later when robot A is being operated automatically under control of its memory, robot B can again be operated in accordance with control data derived from robot A, either directly from the memory of robot A or indirectly from the encoders or other servo feed-back devices of robot A. Of course in that case the memory would contain instructions for causing the control for robot B to be derived from robot A in each operation or sequence where robot B operates under derived control instead of memory control. This kind of operation represents an advantage in terms of conserved space in the memory since in that event little more memory capacity is needed for controlling two robots than for controlling a single robot.

FIG. 7 includes control apparatus for operating both robots under manual control in setting up a sequence of operations to be repeated automatically later, as well as in operating both robots under automatically coordinated manual control. Conventional manual hydraulic control valves and manual controls for drive motors are not shown.

To start a cooperative operation, the robots are manually controlled to execute motions in various coordinates such that both secondary units 34 are directly aligned and are separated by a required distance. The data corresponding to each coordinate of each robot is entered in its respective memory 102 and memory 102a (which may be part of memory 102) representing an initial position. (The same routine is also followed for each other operation of the two robots in the whole sequence of operations to be performed where the two robots are to perform independent operations.) The axis of shaft 78 in secondary unit 34 of robot A is initially positioned in X–Z plane Pa (FIG. 1), for example. A subsequent operation involving aligned cooperation of the two work heads may involve location of shaft 78 in unit 34 of robot A at another X–Z plane Pb. Robot A is controlled manually so that the horizontal actuator in arm 28 retracts secondary unit 34 to the required X coordinate. Control data is derived corresponding to that displacement, and the displacement data is used in controlling the X-coordinate actuator of robot B in a mirror-image or complemental motion.

The same plan could be followed for the operations of the robots in the horizontal Y direction (perpendicular to the plane of FIG. 1). However, the encoder of one of the robots can instead be modified mechanically to operate in reverse, as by an extra interposed gear between its drive mechanism and its Y encoder. Complementary drive of robot B corresponding to operation of robot A can be achieved by electronic means, using Y coordinates for robot A and complements of robot A—s Y coordinates for robot B. With that construction both the robots remain aligned in their travel along the Y and Z axes by operating one robot under manual control and causing the other robot to follow instructions supplied by the directly controlled robot. As a still further alternative, where both robots are to operate according to the same coordinates, either in the Z coordinate alone, or in the Y and Z coordinates, the manual control for each coordinate can take the form of an encoder that supplies digital (or incremental or servo-master) control for both robots. In FIG. 7 it is assumed that the Y and Z motions involve the same displacement data for maintaining secondary units 34 of the two robots opposite each other, but that complemental displacement data is needed for maintaining a prescribed spacing between shaft 78 of robot A and shaft 78 of robot B.

As stated above, the robots are operated initially under manual control to establish their secondary units 34 at an aligned starting relationship, with a prescribed spacing between their shafts 78. When robot A is properly positioned, robot B is controlled manually to position its secondary unit 34 in a prescribed relationship to secondary unit 34 of robot A. At that time, arms 28 of the two robots are aligned and the axes of shafts 78 of the two robots are spaced apart properly for tools 100 to cooperate effectively. The values of the X encoders of both robots A and B are entered into adder 108, and the sum is stored, for example, in an output register of adder 108. Subsequent input to adder 108 is suitably blocked where fixed separation is to be maintained between shafts 78 of the two robots.

For developing a program, each of robots A and B is manually controlled individually when uncoordinated operations are required, as when each robot is to pick up a part from a supply point, or move to a retracted position to avoid an obstruction before advancing to another cooperating work position. At each step, the values of the encoders are all entered into memory section 102 of robot A and into memory section 102a of robot B, using manual "enter" controls 110a, 110b and 110c.

Whenever units 34 of the two robots are to assume a cooperating configuration, when operated under manual control, switches 112a and 112b are shifted out of the positions shown to their opposite positions. The Y and Z drive controls of robot B are rendered responsive to y and Z comparison units 106b, with inputs provided by the Y and Z encoders of robot B and by the Y and Z encoders of robot A. Robot B then acts as a slave to robot A, except that the Y encoder of robot B is reversed as compared to that of robot A as explained above, and consequently robot B is caused to execute operations along the Y axis that are the inverse of Y-axis motions of robot A. A like arrangement is contemplated for causing the motions of robot B along the X axis to be the inverse of the motions of robot A along the X axis. However, in the form shown, X comparison unit 106a for robot B has input from X-encoder 44 of robot A, combined in adder 114 with the value stored in adder 108. Consequently, when robot A is operated under manual control to execute one motion along its X axis, robot B executes an inverse motion along its X axis automatically, maintaining the desired separation between shafts 78 of the two robots.

As each step of the manually controlled operation of robot A is executed, the values in its encoders are entered into the proper part of the memory. In like manner, when robot B is operated as a slave to robot A modified to produce inverse motions, the values of the encoders of robot B may also be entered into the related sections of memory 102a. Subsequently, when operating under memory control to execute the program-controlled motions, the robots would operate according to the various independent and dependent modes with inverse controls as described, but do so in the entirely conventional manner, under program control. As an alternative mentioned above, the values in the memory of robot A can be used to control robot B, using certain coordinates in common and others in the mirror-image mode, by entering instruction for this manner of control into unit 104 and entering the value stored in unit 108 in one of the memories for subsequent use in place of unit 108 during program-controlled operation.

SECONDARY MOTIONS

The operation of each secondary unit 34 of robots A and B as thus far described will achieve effective cooperation of the tools 100 of those robots in three-dimensional coordinate systems X, Y and Z, provided that the line of action of the tools of both robots are aligned along a common X axis. Means (not shown) can be mounted on the support of cylinder 96 of each robot or of one robot to effect X–Y shift of tool 100 laterally of the axis of its arm 28. In that way, a whole sequence of operations could be executed at spaced-apart positions on a work piece carried by one unit 34, using a tool carried by the other unit 34, while the primary actuators of both robots remain fixed.

Figure 2:
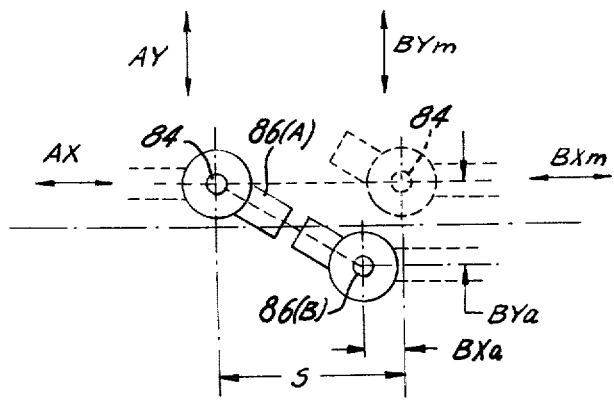
FIG. 2 is a top plan view of portions of the robots of FIG. 1, a portion of one of the robots being shown in dotted lines and in solid lines to represent two different positions.

FIG. 2 shows the secondary motions needed in robot B when the axis of the tool 100 of robot A is at an angle to the X axis in a horizontal plane. It may be considered that robot A carries an X-ray source and robot B carries an image receiver that should always be disposed in a plane transverse to the axis of the X-ray source, centered on that axis and at a constant distance from that source. In another example, tool 100 of robot A may be a bolt holder and tool 100 of robot B may be a nut holder, and secondary units 34 are to cause tools 100 to carry a nut and bolt into position for proper initial cooperation. Thereafter, one or both tools can be rotated by its holder 98, and holder 98 can be thrust forward gradually along its axis by the actuator in head 86, while secondary units 34 are supported in fixed positions by the X, Y and Z controlled actuators of the two robots.

In any operation where head 86 of robot A is to move through an angle as shown in FIG. 2 (an azimuth motion), head 86 of robot B is to be moved through an equal and opposite angle. Because of the requirement that heads 86 are to remain axially aligned and because there is a prescribed separation between the pivotal axes 84 of heads 86, the position of head 86(B) is to be adjusted a distance BYa, and by a distance BXa. A corresponding diagram would show the head adjustments needed for maintaining constant the relationship between heads 86(A) and 86(B), where head 86(A) is moved through an angle about axis 78 (FIG. 6) in the Y-Z plane, an angle of elevation. In the apparatus shown, the axes 78 and 84 intersect each other, at right angles. That intersection may be treated as the support position for each of units 34. The separation S is the initially established distance between the support positions of units 34.

Figure 3:
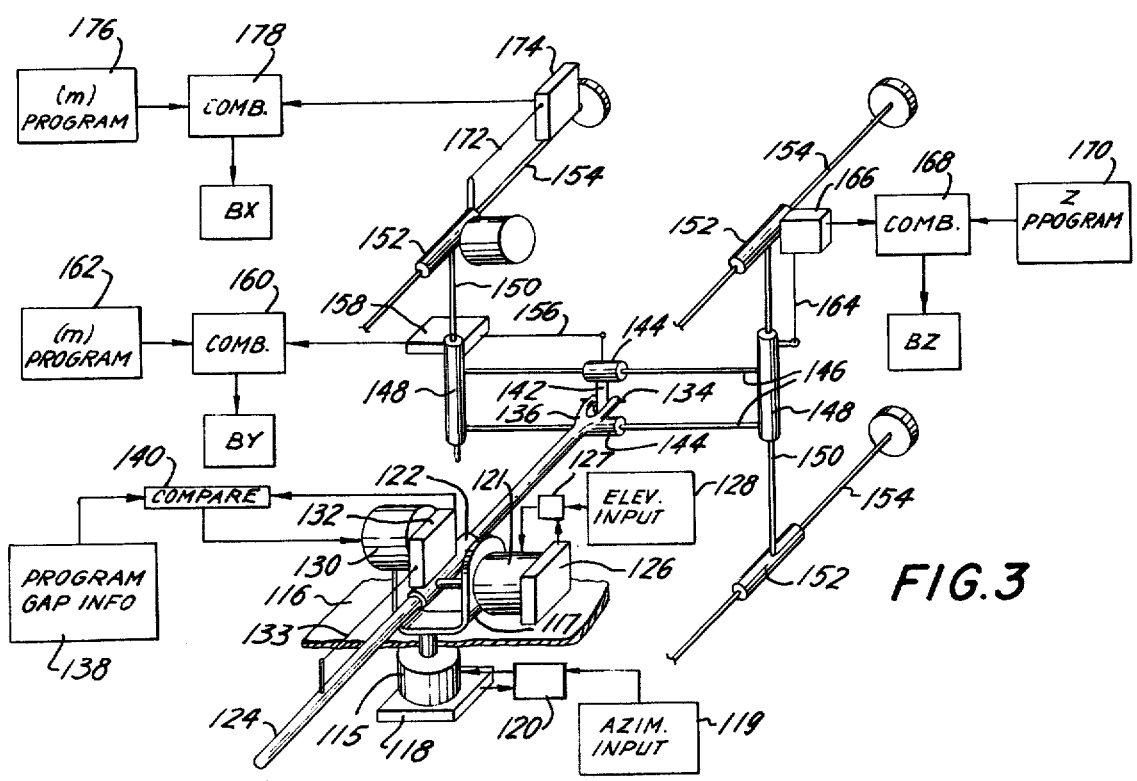
FIG. 3 is a diagrammatic view of control apparatus for coordinating parts of the robots of FIG. 1.

FIG. 3 shows an electromechanical function generator that produces adjustment data to be combined with the X, Y and Z controls of robot B in FIG. 7 to maintain the desired alignment and separation of the heads 86 when the head 86 of robot A is moved through an angle of elevation or azimuth. The adjustment data governs what may be called adjustments or secondary motions BXa, BYa and BZa of robot B. FIG. 2 represents the secondary motions BXa and BYa needed for maintaining alignment and a required separation of heads 96 when head 86 of robot A moves through an azimuth angle. A control in FIG. 3 also makes possible a change in the separation between the positions of heads 86, where different head-support positions may be desired for different operations in a sequence of operations to be performed.

The illustrative function generator is electromechanical. Electromechanical function generators may well be valuable in applying the invention in its broad aspects to various types of control other than the digital control used in the illustrative apparatus, for example, where selsyn control or another analogue type of control is used in place of the described digital control system. Nevertheless, it will be appreciated readily that a purely electronic function generator, or computer, can be used as a substitute for the electromechanical function generator of FIG. 3, as part of the described digital control system and in other types of digital control systems.

In FIG. 3, gear-reduction motor 115 secured to support 116 operates a yoke 117 about a vertical axis. Encoder 118 and comparer 120 enable motor 115 to assume the angular positions dictated by the azimuth input 119. The input 119 may be the same as the program input for comparison with encoder 66 (FIG. 4)

during program-controlled operation. However, when robot A is operated under manual control and robot B is to operate automatically for the desired cooperation, encoder 66 of robot A could serve as the input unit 119. Moreover if a digital encoder were used as a manual control for adjusting the azimuth angle of head 96(A), the same digital manual control would also serve for adjusting the azimuth angle of head 86(B) and in any case such a digital control can serve, also, as input unit 119 (FIG. 3) during manually controlled operation of the robots.

Gear-reduction motor 121 is carried by yoke 117 and has a horizontal axis that intersects with the axis of yoke 117 for rotating a guide tube 122 containing rod 124 through angles of elevation. Encoder 126 provides digital information representing the angle of elevation of rod 124, for use in comparer 127 to match digital information supplied by input 128. The latter may be the same input information source as is used in controlling motor 54' to achieve match with encoder 66', or encoder 66' of robot A can itself be used as the input 128.

Gear-reduction motor 130 and encoder 132 are mounted on guide tube 122. Motor 130 is coupled to rod 124 (as by rack-and-gear drive) to determine the length of rod 124 between the pivotal axis 134 of clevis 136 at the end of rod 124 and the intersection of the axis of yoke 117 with the tilt axis of guide tube 122. Encoder 132 has an operating cable 133 connected to shaft 124. Motor 130 may be operated under direct manual control, or under control of a manually operated encoder, or it may be used as a digital servo under memory control, for establishing and changing the prescribed separation between the axes 78(A) and 78(B), being the same as the separation between the axes of shafts 84(A) and 84(B). Thus, stored information in one of the memory sections 102, 102a may be used to supply input 138 for match in comparer 140 producing output that controls motor 130 and adjusts the operative length of rod 124 in accordance with the input information.

Clevis 136 has a pivot along horizontal axis 134 that intersects with the vertical axis of tube 142. The latter swivels about an internal vertical rod fixed to horizontal slide guides 144. Motors 115 and 121 operate to change the elevation and azimuth angles of rod 124. This action operates clevis 136 to cause guides 144 to slide along their shafts 146 and it operates guide tubes 148 fixed to the ends of rods 146 along vertical rods 150. The latter are fixed to pairs of guide tubes 152 (only three of these tubes being shown) that are slidable along horizontal parallel rods 154. Each of the rods 154 has fixed supports at each of its ends. As the direct result of the operation of motors 115 and 121 to change the azimuth and elevation angles of rod 124, the axis of tube 142 shifts horizontally and operates cable 156 to adjust an encoder 158. The output of this encoder is added in combining unit 160 to the digital input data from input 162 that controls robot B for the Y axis. Likewise, operation of motors 115 and 121 causes vertical shift of clevis 136 that operates cable 164 to adjust encoder 166 for generating adjustment data for Z-coordinate control of robot B. The output of encoder 166 is combined in unit 168 with digital control input 170 for the Z axis of robot B. Finally, operation of motors 115 and 121 causes horizontal shift of guide tubes 152, one of which is connected by cable 172 to encoder 174 for generating adjustment data for controlling operation of robot B along the X axis, by using adder 178 to combine the encoder output with digital input data available at input 176.

REVIEW

1. Manually Controlled Cooperating Manipulators

Units A and B can be operated to advantage as manually controlled manipulators, for executing operations in which work heads 86 cooperate with each other. Switches 112a and 112b can be operated out of the position shown in FIG. 7 to the opposite positions. Operation of the manual controls for manipulator A enables the user to bring its secondary unit 34 to a desired height (the Z-coordinate) and to a desired location along rail 12 (the Y-coordinate); and its arm length can also be adjusted (the X-coordinate). The output of its encoder 30 would then provide automatic height control for manipulator B via switch 112b, comparer 106b and the Z-encoder 30 of manipulator B, for attaining the same height of unit 34 in manipulator B as that reached by secondary unit 34 of manipulator A under manual control. As an alternative to manual valves or switches for controlling the actuators of manipulator A, a manually operated encoder could be used in place of memory 102 (FIG. 7) to supply input to comparer 106 of manipulator A. In that case, the same manually operated encoder forming part of manipulator A could be used for controlling manipulator B along the Z-coordinates. In both instances (whether a manually operated encoder or the feed-back encoder 30 is used), a part of manipulator A is used to control the operation of both units 34 to the same height.

What has been said about the Z-coordinate operation applies to operation along the Y-coordinates as well, it being remembered that encoder 22 of manipulator B advantageously operates as the inverse of encoder 22 of manipulator A. Manipulator B can be operated under control of the encoders of manipulator A, or under control of a common encoder serving both manipulators, or forming part of one manipulator and used for controlling the other. That an inverse relationship is introduced in the controls for the motions of the manipulators along the Y-coordinates signifies operation in the mirror-image mode.

Complemental operation along the X-coordinates can be realized in the same way as in the Y-coordinate operations of the two manipulators. However, yet another way of providing the complemental mode of control is realized through the use of an encoder for manipulator A that has its output combined in adder 114 to yield a control value which in turn determines the proper extended length of arm 28 of manipulator B for establishing and maintaining a constant separation between shafts 78 of the two manipulators. If secondary unit 34 of manipulator A is shifted from one position to a more extended position, the representation of the latter provided by its encoder 44, combined with the initially established value representing the separation of the units 34 from each other calls for a less-extended arm of manipulator B. This motion of manipulator B is the inverse of the corresponding motion of manipulator A.

The primary operation of the two cooperating manipulators, one dependent on the other for control, is thus carried out in complemental modes. In the example given, the manipulators are opposite each other, with their arms 28 in endwise alignment. The same concepts obtain where the cooperating manipulators are disposed side-by-side. Control of one manipulator follows the other in executing certain directly corresponding motions (e.g., height) and other corresponding but inverse motions.

Like coordination of two manipulators can also be carried out where the manipulators are neither side-by-side nor opposite each other, and then a suitable computer would be included for deriving control for one manipulator from the control of the operation of the other manipulator.

2. Program-Controlled Cooperating Robots

As purely manually controlled cooperating manipulators, such apparatus has many advantages, some of which are outlined above. Also as shown and described, the apparatus can be equipped with a memory, where control information is entered during initial manually controlled operations for later use in automatic repeat-cycles of program-controlled operation of both manipulators, then becoming robots. Moreover, control information may not be provided either manually or from a memory, but instead control information for one manipulator may be supplied by other means such as by computer, and even then complementary modes of control for the other manipulator can be used to advantage.

3. Primary-Motion Coordinate Systems

While a rectangular coordinate system is the basis for the system described, clearly the same rules apply to a manipulator having an adjustable-length arm operable through azimuth and elevation angles (a polar-coordinate system) to effect primary motions for transporting secondary units 34 in space. Mixed rectangular and polar coordinate systems are also amenable to the same kind of cooperative operation of two manipulators and of two robots.

4. Varied Relationship between Dual Manipulators

The initially established separation between the secondary units can of course be varied, as may be required while maintaining the coordinated control of the two manipulators or robots. Thus, increased or decreased spacing between the two secondary units (represented by their shafts 78, for example) can be introduced, using encoder 132 or otherwise changing the value supplied to adder 114 via switch 182. Moreover, both manipulators can be controlled alike, using common control, to move their units 34 to approach a work piece from different directions, limiting the operation of their actuators under control of work-sensing feelers. Spacing established in that way can be registered and used for subsequent control, as needed.

5. Type of Control

The described manipulators include digital controls, providing absolute coordinates identifying digitally each position to be assumed by each actuated component. The described system of carrying out cooperative operations using manipulators can be adapted readily to other types of control, including analog servo systems, as well as digital systems that utilize incremental control information in progressing from one operation to the next. Regardless of the basis of control, cooperating manipulators are rendered operable to execute certain operations that are alike and others that are inverse or otherwise complementary without the necessity of applying individual attention or control input to the second manipulator.

6. Secondary Motions

Not only is control provided for the primary operation of the second manipulator for complementing the operation of the first, but the secondary operations of the two are also subject to automatic mutually complementing operation under common control. In this aspect of the whole, it has been assumed that a prescribed orientation of tools 100 is of concern, and here the axial alignment of work heads 86 is adopted. However, the work head itself can assume many forms. Thus, where one work head is a tool for honing cylinders and the other is a clamp for a motor block having a row of cylinders, one or the other of the work heads 86 can incorporate a further motion transverse to the axis of tool 100, for enabling the honing tool to line up with successive bores.

7. Mixed Cooperating and Independent Sequence

A complete set of separate individual controls for manipulator B is normally included, in order to enable manipulator B to execute its own separate operations when required, as in executing an article-transporting operation. A bolt may be picked up from a supply point by manipulator A in its own separate and independent motion and a nut may be picked up by manipulator B, separately under independent control. These operations are executed under manual control initially and entered into memories for later operation of the manipulators as program-controlled robots. A single memory can serve both robots where there is a cooperative operation or sequence to be performed; and a single memory can also be utilized for both robots A and B where they operate independently, by using multiplex techniques for routing sequential memory entries to provide control input to robots A and B alternately.

As an example of a further mode of cooperative yet individual operation, one manipulator may be operated to do one job, and then the other manipulator may be operated to do another job while the first is locked and at rest, and vice versa. For example, one manipulator can be controlled to insert a bolt into a hole in a product to be assembled automatically; the other manipulator can then apply a nut to the bolt; and while the nut is being driven onto the bolt, the manipulator holding the bolt may be locked. These manually controlled operations are entered into memories for subsequent automatic or robot operation. The memories provided in FIG. 7 can be simplified so as to use but one memory for both robots, switching the memory output to each robot as required while locking the other robot. The program function control 104 (FIG. 7) determines the routing of the memory output to one robot or the other in this mode of operation.

Various uses may be devised and various changes may be introduced in the illustrative embodiment of the invention in its various aspects as described above and shown in the accompanying drawings. Consequently, the invention should be construed broadly in accordance with its full spirit and scope.

What is claimed is:

1. In combination, first and second manipulators of like construction having first and second work heads, respectively, for performing complementary operations, said manipulators being disposed in relation to each other for enabling said work heads to perform said complementary operations, said first manipulator including operating means for effecting translation of said first work head through a succession of motions, said operating means having plural actuating means for effecting translation of said first work head along plural coordinates and control means for said actuators including means for providing successive commands, and said second manipulator including second operating means having plural actuating means for effective translation of said second work head through a succession of translations along plural coordinates corresponding to those of the first manipulator, said second operating means being responsive at least indirectly to the successive commands of said first manipulator for positioning said second work head to perform operations complementary to said first work head.

2. First and second manipulators in accordance with claim 1, wherein said second manipulator includes further control means providing for independent control of said second actuating means to enable said work heads to execute independent motions additional to the aforesaid translations of the work heads.

3. First and second manipulators in accordance with claim 1, wherein said means for providing successive commands includes a stored program for determining an automatic sequence of operations of both said manipulators, said program further including control portions providing for independent operations of said first and second manipulators as part of said sequence of operations.

4. First and second manipulators in accordance with claim 1, wherein said plural operating means responsive to said successive commands of said first manipulator include means for providing like control for at least one of said actuating means of said second manipulator and for providing inverse control for at least another of said actuating means of said second manipulator, said like control and inverse control being in reference to the control of the corresponding actuating means of said first manipulator.

5. First and second manipulators in accordance with claim 1, wherein said actuating means of each manipulator includes first, second and third actuating means for transporting the work head in three-dimensional space, said control means being arranged to provide like control over said first actuating means of said first manipulator and said first actuating means of said second manipulator, wherein said control means is arranged to provide inverse control over said second actuating means of said second manipulator as compared to the control provided over said second actuating means of said first manipulator, and wherein said control means is arranged to provide complemental control over said third actuating means of said manipulators.

6. First and second manipulators in accordance with claim 1, wherein one of said actuating means of each of said manipulators includes a lengthwise extensible arm supporting the related work head, and wherein the control means includes means for representing the effective length of one of said arms, further including means for storing a quantity representing the desired spatial relationship of said work heads, said second operating means being responsive to the stored quantity and the representation of the length of said one arm for deriving the requisite control for the length of the other of said extensible arms.

7. First and second manipulators in accordance with claim 1, wherein the aforesaid plural actuating means of each manipulator constitute a primary operating unit, each said manipulator additionally includes a secondary unit carried by said primary operating unit, each said work head being carried by a related secondary unit, said secondary units including means for adjusting the angles of said work heads about respective pivots relative to said primary units, respectively, said control means being arranged to provide control over said means for adjusting the angles of the work heads equally, means for representing the desired distance between said pivots to establish the desired spatial relationship between said work heads, and computer means responsive to said means for adjusting the angles of the work heads and said desired distance representing means for modifying the control of said control means over said primary unit for maintaining alignment of the work heads over a range of angular adjustments thereof.

8. First and second manipulators in accordance with claim 7, wherein said computer means includes electromechanical means for generating corrective factors for the aforesaid adjustment.

9. First and second manipulators in accordance with claim 1, wherein said plural actuating means of each said manipulator includes a main base and means for transporting said main base along a prescribed path, the paths of said manipulators being opposite each other and spaced apart along their lengths, said plural actuating means of said manipulators supporting said work heads for performing a cooperative operation along an axis crossing a surface extending between said paths.

10. First and second manipulators in accordance with claim 1 wherein at least one of said plural actuating means of each said manipulator includes a feed-back position representing means, and wherein said second operating means includes said position-representing means of the first manipulator as a servo master and said position-representing means of the second manipulator as a slave, and means for comparing said master and slave for controlling said one actuating means of the second manipulator in accordance with the operation of said one of the actuating means of the first manipulator.

11. First and second manipulators in accordance with claim 10, wherein each said position-representing means is a digital encoder.

12. First and second manipulators in accordance with claim 9, wherein said means for providing successive commands includes stored entries representing positions of at least one actuating means of the first manipulator, said first manipulator having position representing means coupled to said one actuating means thereof and comparing means for enabling said entries to serve as servo master input in controlling said one actuating means, and wherein said second operating means includes second position representing means coupled to one of said plural actuating means thereof and means for comparing said position representing means of said first and second manipulators for controlling said one of said plural actuating means of said second manipulator.

13. First and second manipulators in accordance with claim 1, wherein at least one of said plural actuating means of each of said first and second manipulators are controlled by said command providing means to operate alike, at least a second of said actuating means of each of said manipulators are controlled by said command providing means to operate in the mirror-image mode, and in which at least a third one of said plural supporting and actuating means of each of said first and second manipulators are controlled by said command providing means to effect complemental operation thereof.

14. First and second manipulators each having a work head and having plural supporting and actuating means operable in respective degrees of freedom for transporting the work head and disposed in relation to each other to execute both separate and cooperating operations, manual means for controlling each of said actuating means and said work heads to enable execution of the desired operations of said manipulators under manual control initially, memory control means for controlling either of said manipulators separately including control of the plural actuating means and the work head thereof under automatic control, means for entering control commands into the memory control means from a selected one of said manipulators corresponding to the manually executed operations thereof for use subsequently, and function control means for causing locking of said plural actuating means of one of said manipulators selectively while causing said memory control means to control the other of said manipulators.

15. Apparatus for performing work operations including first and second manipulators having, respectively, work devices adapted to perform complementary work operations, said manipulators being essentially alike and each having a support and support-displacing means for transporting a respective one of said work devices along at least two coordinates, said manipulators having control means for said support-displacing means for causing displacement of said supports to corresponding positions and for causing the work devices to assume parallel attitudes, and computer means operable in dependence on the controlled attitudes of said work device for modifying the control of said support-displacing means of at least one of said manipulators by said control means to bring the work devices into alignment with each other.

16. Apparatus in accordance with claim 15, further including means for storing a representation of the desired separation between said supports of said work devices, and wherein said computer means is additionally responsive to said representation storing means for modifying the control of said support-displacing means of at least one of said manipulators for maintaining said desired separation between said work-device supports.

* * * * *